US011289798B2

(12) United States Patent
Kaistha

(10) Patent No.: US 11,289,798 B2
(45) **Date of Patent: *Mar. 29, 2022**

(54) CONNECTIVITY AND FIELD REPLACEABILITY OF RADIOS MOUNTED ON BASE STATION ANTENNAS

(71) Applicant: CommScope Technologies LLC, Hickory, NC (US)

(72) Inventor: Amit Kaistha, Coppell, TX (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/875,336

(22) Filed: May 15, 2020

(65) Prior Publication Data

US 2021/0265722 A1 Aug. 26, 2021

Related U.S. Application Data

(60) Provisional application No. 62/980,553, filed on Feb. 24, 2020.

(51) Int. Cl.
*H04M 1/00* (2006.01)
*H01Q 1/24* (2006.01)
*H01Q 1/42* (2006.01)

(52) U.S. Cl.
CPC ............... *H01Q 1/246* (2013.01); *H01Q 1/42* (2013.01)

(58) Field of Classification Search
CPC ........ H01Q 1/246; H01Q 1/42; H01Q 21/065; H01Q 21/0037; H01Q 25/001
See application file for complete search history.

(56) References Cited

U.S. PATENT DOCUMENTS

2005/0206575 A1* 9/2005 Chadwick .............. H01Q 1/523 343/797
2011/0237299 A1* 9/2011 Boss ...................... H01Q 1/246 455/562.1

(Continued)

FOREIGN PATENT DOCUMENTS

CN 201233948 Y 5/2009
CN 208782034 U 4/2019

(Continued)

OTHER PUBLICATIONS

"Extended European Search Report corresponding to European Patent Application No. 20175086.6, dated Oct. 26, 2020".

(Continued)

*Primary Examiner* — Tuan Pham
(74) *Attorney, Agent, or Firm* — Myers Bigel, P.A.

(57) ABSTRACT

A base station antenna assembly that may include a base station antenna having a frame and a radome that covers the frame; and a first radio mounted to a radio support plate on a rear side of the base station antenna. The radio support plate may be configured to attach to the base station antenna by at least one guide rail that cooperates with one or more guide structures of the radio support plate. A rear surface of the radome may include a plurality of access holes, and the base station antenna assembly may include a plurality of connectorized cables soldered to components within an interior of the base station antenna that extend from the interior of the base station antenna through respective ones of the access holes.

20 Claims, 12 Drawing Sheets

(56) References Cited

U.S. PATENT DOCUMENTS

| | | | | |
|---|---|---|---|---|
| 2012/0280874 | A1 | 11/2012 | Kim et al. | |
| 2017/0215192 | A1* | 7/2017 | Lipowski .......... | H04W 72/0453 |
| 2017/0365921 | A1 | 12/2017 | Webb et al. | |
| 2019/0390797 | A1 | 12/2019 | Bell et al. | |
| 2021/0218156 | A1* | 7/2021 | Patel .................. | H01Q 21/0037 |

FOREIGN PATENT DOCUMENTS

| | | | |
|---|---|---|---|
| EP | 0994524 | B1 | 2/2003 |
| EP | 3217475 | A1 | 9/2017 |
| WO | 2013191800 | A1 | 12/2013 |
| WO | 2016036951 | A1 | 3/2016 |
| WO | 2016095960 | A1 | 6/2016 |
| WO | 2018/140305 | A1 | 8/2018 |

OTHER PUBLICATIONS

Notification of Transmittal of the International Search Report and the Written Opinion of the International Searching Authority, or the Declaration for International Application PCT/US2019/054661, dated Feb. 14, 2020, 14 pgs.

* cited by examiner

CONNECTIVITY AND FIELD REPLACEABILITY OF RADIOS MOUNTED ON BASE STATION ANTENNAS

CROSS-REFERENCE TO RELATED APPLICATIONS

The present application claims priority to U.S. Provisional Application No. 62/980,553, filed on Feb. 24, 2020, and is related to U.S. Provisional Patent Application Ser. No. 62/779,468, filed Dec. 13, 2018, to U.S. Provisional Patent Application Ser. No. 62/741,568, filed Oct. 5, 2018, and to PCT Application No. PCT/US2019/054661, the content of each of which is incorporated by reference herein as if set forth in its entirety.

BACKGROUND

The present inventive concepts generally relate to radio communications and, more particularly, to base station antennas for cellular communications systems.

Cellular communications systems are well known in the art. In a cellular communications system, a geographic area is divided into a series of regions that are referred to as "cells" which are served by respective base stations. The base station may include one or more antennas that are configured to provide two-way radio frequency ("RF") communications with mobile subscribers that are within the cell served by the base station. In many cases, each cell is divided into "sectors." In one common configuration, a hexagonally shaped cell is divided into three 120° sectors in the azimuth plane, and each sector is served by one or more base station antennas that have an azimuth Half Power Beamwidth (HPBW) of approximately 65°. Typically, the base station antennas are mounted on a tower or other raised structure, with the radiation patterns (also referred to herein as "antenna beams") that are generated by the base station antennas directed outwardly. Base station antennas are often implemented as linear or planar phased arrays of radiating elements.

In order to accommodate the increasing volume of cellular communications, cellular operators have added cellular service in a variety of new frequency bands. While in some cases it is possible to use a single linear array of so-called "wide-band" radiating elements to provide service in multiple frequency bands, in other cases it is necessary to use different linear arrays (or planar arrays) of radiating elements to support service in the different frequency bands.

As the number of frequency bands has proliferated, and increased sectorization has become more common (e.g., dividing a cell into six, nine or even twelve sectors), the number of base station antennas deployed at a typical base station has increased significantly. However, due to, for example, local zoning ordinances and/or weight and wind loading constraints for the antenna towers, there is often a limit as to the number of base station antennas that can be deployed at a given base station. In order to increase capacity without further increasing the number of base station antennas, multi-band base station antennas have been introduced which include multiple linear arrays of radiating elements. One common multi-band base station antenna design includes two linear arrays of "low-band" radiating elements that are used to provide service in some or all of the 617-960 MHz frequency band and two linear arrays of "mid-band" radiating elements that are used to provide service in some or all of the 1427-2690 MHz frequency band. The four linear arrays are mounted in side-by-side fashion. There is also interest in deploying base station antennas that include one or more linear arrays of "high-band" radiating elements that operate in higher frequency bands, such as some or all of the 3.3-4.2 GHz frequency band. As larger numbers of linear arrays are included in base station antennas, it becomes more difficult, time-consuming and expensive to design, fabricate and test these antennas.

SUMMARY

According to some aspects of the present disclosure, a base station antenna assembly may include a base station antenna having a frame and a radome that covers the frame; and a first radio mounted to a radio support plate on a rear side of the base station antenna. The radio support plate may be configured to attach to the base station antenna by at least one guide rail that cooperates with one or more guide structures of the radio support plate.

In some aspects, the guide rail may include a slot, which may in some aspects have a generally C-shaped cross-section. In some aspects, the one or more guide structures may include a rod, which may be formed of a plastic material. In some aspects, the base station antenna may include a plurality of jumper cables that communicatively couple the base station antenna with the first radio. In some aspects, the base station antenna assembly may include at least two cables that communicatively couple the base station antenna with the first radio, with the at least two cables ganged together via a ganged connector. In some aspects, a rear surface of the radome may include a plurality of access holes, and the base station antenna assembly may include a plurality of connectorized cables soldered to components within an interior of the base station antenna that extend from the interior of the base station antenna through respective ones of the access holes. In some aspects, a rear surface of the radome may include a panel in which a plurality of connector ports are mounted.

According to some aspects of the present disclosure, a base station antenna assembly may include a base station antenna having a frame and a radome that covers the frame, and a first radio mounted on a radio support plate. A first guide rail may be mounted on one of the base station antenna and the radio support plate and a first cooperating rod may be mounted on the other of the base station antenna and the radio support plate. The first guide rail and the first corresponding rod may be configured so that when the first cooperating rods are received within a slot in the first guide rail the radio support plate is mounted on the base station antenna.

In some aspects, the base station antenna assembly may include a first locking pin, where the first guide rail comprises top and bottom walls each having a first pin through hole therein which is dimensioned to receive the first locking pin. The first corresponding rod may include first pin through holes therein which are dimensioned to receive the first locking pin. In some aspects, the base station antenna assembly may include a second locking pin, where the top and bottom walls each have a second pin through hole therein which is dimensioned to receive the second locking pin. The first corresponding rod may include second pin through holes therein which are dimensioned to receive the second locking pin. In some aspects, the first guide rail may be mounted on the base station antenna and the first corresponding rod may be mounted on the radio support plate opposite the first radio.

According to some aspects of the present disclosure, a base station antenna assembly may include a base station antenna having a frame, a radome that covers the frame, and a bottom end cap; and a first radio mounted to the frame on a rear side of the base station antenna. A rear surface of the radome may include a first opening, and a panel having a plurality of access holes may be mounted in the first opening. A plurality of connectorized cables may be soldered to components within an interior of the base station antenna and may extend from the interior of the base station antenna through respective ones of the access holes.

In some aspects, the first radio may be mounted to the frame via a first radio support plate. A first guide rail may be mounted on one of the base station antenna and the radio support plate and a first cooperating rod may be mounted on the other of the base station antenna and the radio support plate. The first guide rail and the first corresponding rod may be configured so that when the first cooperating rods are received within a slot in the first guide rail the radio support plate is mounted on the base station antenna. In some aspects, the base station antenna assembly may include first locking pin, and the first guide rail may include top and bottom walls each having a first pin through hole therein which is dimensioned to receive the first locking pin. In some aspects, the first corresponding rod may include first pin through holes therein which are dimensioned to receive the first locking pin. In some aspects, the base station antenna assembly may include a second locking pin, and the top and bottom walls may each have a second pin through hole therein which is dimensioned to receive the second locking pin.

DETAILED DESCRIPTION

Embodiments of the present inventive concepts will now be described in further detail with reference to the attached figures.

Figure 1:
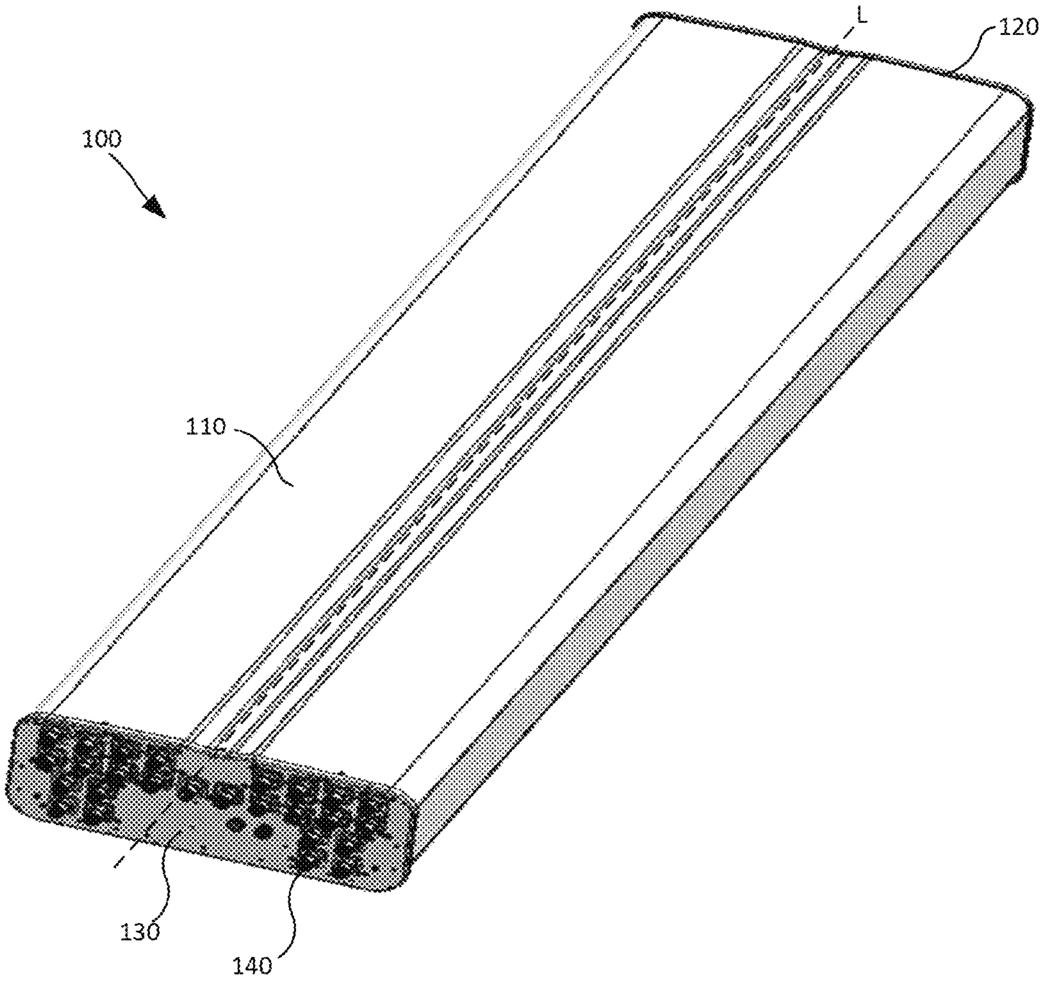
FIG. 1 is a perspective view of a base station antenna according to embodiments of the present inventive concepts.
Figure 2:
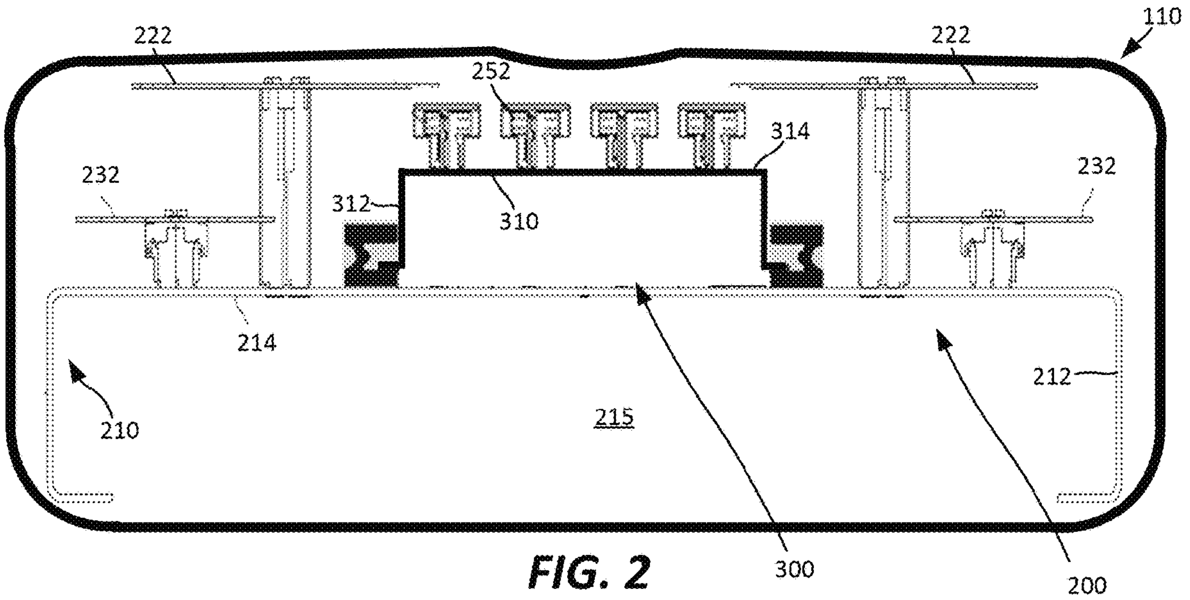
FIG. 2 is a schematic cross-sectional view of the antenna assembly with the elements mounted behind the main backplane and the sub-module backplane omitted.

FIGS. 1 and 2 illustrate a base station antenna 100 according to certain embodiments of the present inventive concepts. In the description that follows, the antenna 100 will be described using terms that assume that the antenna 100 is mounted for use on a tower with the longitudinal axis L of the antenna 100 extending along a vertical axis and the front surface of the antenna 100 mounted opposite the tower pointing toward the coverage area for the antenna 100.

Referring first to FIG. 1, the base station antenna 100 is an elongated structure that extends along a longitudinal axis L. The base station antenna 100 may have a tubular shape with generally rectangular cross-section. The antenna 100 includes a radome 110 and a top end cap 120. The radome 110 and the top end cap 120 may comprise a single integral unit, which may be helpful for waterproofing the antenna 100. One or more mounting brackets (not shown) may be provided on the rear side of the antenna 100 which may be used to mount the antenna 100 onto an antenna mount (not shown) on, for example, an antenna tower. The antenna 100 also includes a bottom end cap 130 which includes a plurality of connectors 140 mounted therein. The antenna 100 is typically mounted in a vertical configuration (i.e., the longitudinal axis L may be generally perpendicular to a plane defined by the horizon) when the antenna 100 is mounted for normal operation. The radome 110, top cap 120 and bottom cap 130 may form an external housing for the antenna 100. An antenna assembly (not shown in FIG. 1) may be contained within the housing. The antenna assembly may be slidably inserted into the radome 110, typically from the bottom before the bottom cap 130 is attached to the radome 110.

Figure 3:
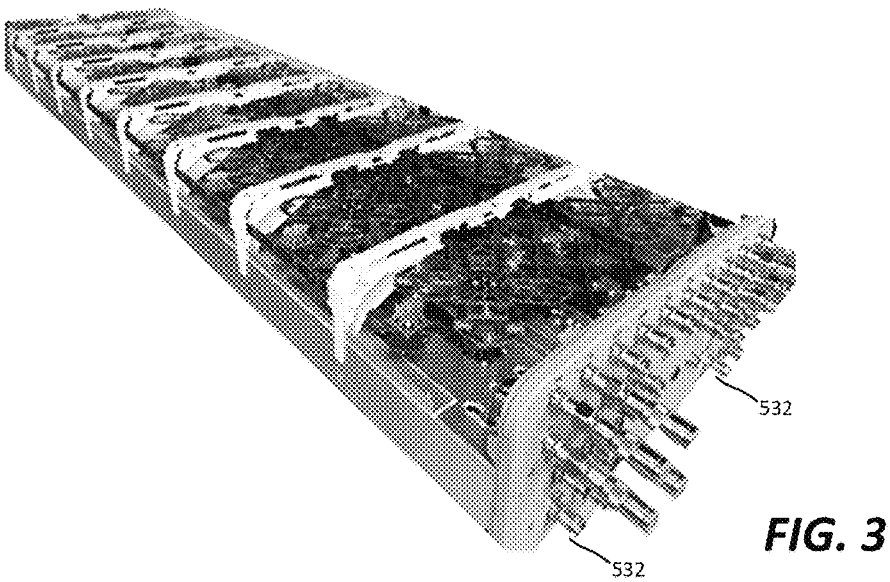
FIG. 3 is a front perspective view of a base station antenna having a large number of RF connector ports.

Briefly, as seen in the cross-sectional view of FIG. 2, the antenna assembly 200 may include a main backplane 210 that has sidewalls 212 and a main reflector 214. The backplane 210 may serve as both a structural component for the antenna assembly 200 and as a ground plane and reflector for the radiating elements mounted thereon. The backplane 210 may also include brackets or other support structures (not shown) that extend between the sidewalls 212 along the rear of the backplane 210. In FIG. 2, various mechanical and electronic components of the antenna 100 that are mounted in the chamber 215 defined between the sidewalls 212 and the back side of the main reflector 214, such as phase shifters, remote electronic tilt units, mechanical linkages, controllers, diplexers, and the like, are omitted to simplify the drawing, and the cross-section of the radome 110 is included in FIG. 3 to provide context.

The main reflector 214 may comprise a generally flat metallic surface that extends in the longitudinal direction L of the antenna 100. Some of the radiating elements (discussed below) of the antenna 100 may be mounted to extend forwardly from the main reflector 214, and the dipole radiators of these radiating elements may be mounted approximately ¼ of a wavelength of the operating frequency for each radiating element forwardly of the main reflector 214. The main reflector 214 may serve as a reflector and as a ground plane for the radiating elements of the antenna 100 that are mounted thereon.

As shown in FIG. 2, the antenna 100 may include a plurality of dual-polarized radiating elements 222, 232, 252. The radiating elements include low-band radiating elements 222, mid-band radiating elements 232, and high-band radiating elements 252. The low-band radiating elements 222 may be mounted to extend upwardly from the main reflector 214 and, in some embodiments, may be mounted in two columns to form two linear arrays of low-band radiating elements 222. Each low-band linear array may extend along substantially the full length of the antenna 100 in some embodiments. The low-band radiating elements 222 may be configured to transmit and receive signals in a first frequency band. In some embodiments, the first frequency band may comprise the 617-960 MHz frequency range or a portion thereof (e.g., the 617-896 MHz frequency band, the 696-960 MHz frequency band, etc.).

The mid-band radiating elements 232 may likewise be mounted to extend upwardly from the main reflector 214 and may be mounted in two columns to form two linear arrays of first mid-band radiating elements 232. The linear arrays of mid-band radiating elements 232 may extend along the respective side edges of the main reflector 214. The mid-band radiating elements 232 may be configured to transmit and receive signals in a second frequency band. In some embodiments, the second frequency band may comprise the 1427-2690 MHz frequency range or a portion thereof (e.g., the 1710-2200 MHz frequency band, the 2300-2690 MHz frequency band, etc.).

The high-band radiating elements 252 may be mounted in four columns in a portion of the antenna 100 to form four linear arrays of high-band radiating elements 252. The high-band radiating elements 252 may be configured to transmit and receive signals in a third frequency band. In some embodiments, the third frequency band may comprise the 3300-4200 MHz frequency range or a portion thereof.

In other embodiments, the number of linear arrays of low-band, mid-band and high-band radiating elements may be varied from what is shown in FIG. 2. For example, the number of linear arrays of each type of radiating elements may be varied from what is shown, some types of linear arrays may be omitted and/or other types of arrays may be added, the number of radiating elements per array may be varied from what is shown, and/or the arrays may be arranged differently.

In the depicted embodiment, the low-band and mid-band radiating elements 222, 232 may each be mounted to extend forwardly from the main reflector 214. The high-band radiating elements 252 may each be mounted to extend forwardly from a sub-module reflector, as will be described in further detail below.

Each linear array of low-band radiating elements 222 may be used to form a pair of antenna beams, namely an antenna beam for each of the two polarizations at which the dual-polarized radiating elements are designed to transmit and receive RF signals. Likewise, each array 232 of first mid-band radiating elements 232 and each array 252 of high-band radiating elements 252 may be configured to form a pair of antenna beams, namely an antenna beam for each of the two polarizations at which the dual-polarized radiating elements are designed to transmit and receive RF signals. Each linear array may be configured to provide service to a sector of a base station.

Some or all of the radiating elements 222, 232, 252 may be mounted on feed boards (not shown) that couple RF signals to and from the individual radiating elements 222, 232, 252. One, or more than one, radiating elements 222, 232, 242, 252 may be mounted on each feed board. Cables (not shown) may be used to connect each feed board to other components of the antenna 100 such as diplexers, phase shifters, calibration boards or the like.

In some embodiments, the base station antennas according to embodiments of the present inventive concepts may be reconfigurable antennas that include one or more self-contained sub-modules. The base station antenna 100 includes one such sub-module 300, which may be may be slidably received on the main backplane 210. In some embodiments, the main reflector 214 may have an opening (not shown) and the sub-module 300 may be received in the general area of this opening when the antenna 100 is fully assembled. However, it will be appreciated that embodiments of the present inventive concepts are not limited thereto, and that one or more smaller openings may be used in other embodiments, or the opening may be omitted entirely.

The sub-module 300 may include a sub-module backplane 310. The sub-module backplane 310 may include sidewalls 312 and a sub-module reflector 314. The four linear arrays of high-band radiating elements 252 may be mounted to extend forwardly from the sub-module reflector 314. As can best be seen in FIG. 2, the sub-module reflector 314 may be mounted forwardly of the main reflector 214. This may advantageously position the high-band radiating elements 252 closer to the radome 110 so that the radome 110 is within the near field of the high-band radiating elements 252. Greater detail concerning the sub-module is provided in PCT Application No. PCT/US2019/054661, which has already been incorporated by reference.

The antenna assembly 100 of FIGS. 1 and 2 may have a number of advantages over conventional antennas. As cellular operators upgrade their networks to support fifth generation ("5G") service, the base station antennas that are being deployed are becoming increasingly complex. For example, due to space constraints and/or allowable antenna counts on antenna towers of existing base stations, it may not be possible to simply add new antennas to support 5G service. Accordingly, cellular operators are opting to deploy antennas that support multiple generations of cellular service by including linear arrays of radiating elements that operate in a variety of different frequency bands in a single antenna. Thus, for example, it is common now for cellular operators to request a single base station antenna that supports service in three, four or even five or more different frequency bands. Moreover, in order to support 5G service, these antennas may include multi-column arrays of radiating elements that support active beamforming. Cellular operators are seeking to support all of these services in base station antennas that are comparable in size to conventional base station antennas that supported far fewer frequency bands. This raises a number of challenges.

One challenge in implementing the above-described base station antennas is that the number of RF connector ports included on the antenna is significantly increased. Whereas antennas having six, eight or twelve connector ports were common in the past, the new antennas may require far more RF connections. For example, the antenna assembly 100 that is described with reference to FIGS. 1 and 2 may include two linear arrays of low-band radiating elements 222, two linear arrays of first mid-band radiating elements 232, and a four column planar array of high-band radiating elements 252. All of the radiating elements 222, 232, 252 may comprise dual-polarized radiating elements. Consequently, each column of radiating elements will be fed by two separate connector ports on a radio, and thus a total of twenty-four RF connector ports are required on the base station antenna 200 to pass RF signals between the twelve separate columns of radiating elements and their associated RF connector ports on the cellular radios. Moreover, each of the four column planar arrays of radiating elements are operated as a beamforming array, and hence a calibration connector port is required for each such array, raising the total number of RF connector ports required on the antenna to twenty-six. Additional control ports are also typically required which are used, for example to control electronic tilt circuits included in the antenna.

Conventionally, the above-described RF connector ports, as well as any control ports, have been mounted in the lower end cap of a base station antenna, as seen in FIG. 1 at 130. Mounting the RF connector ports in this location can help locate the RF connector ports close to remote radio heads that are mounted separate from the antenna, which may improve the aesthetic appearance of the installed equipment and reduce RF cable losses. Additionally, mounting the RF connector ports to extend downwardly from the bottom end plate helps protect the base station antenna from water ingress through the RF connector ports and may shield the RF connector ports from rain.

Unfortunately, as the number of RF connector ports required in some base station antennas is increased, while the overall size of the antennas are kept relatively constant, the spacing between the RF connector ports on the bottom end cap may be reduced significantly. This can be seen, for example, in FIG. 3, which is a perspective view of a base station antenna having a large number of RF connector ports 532. When the RF connector ports 532 are close together as is the case in the antenna illustrated in FIG. 3, it may be difficult for technicians to install (and properly tighten) coaxial jumper cables onto the RF connector ports 532. If a jumper cable is not properly installed onto its corresponding RF connector port 532, various problems including passive intermodulation distortion or even loss of the RF connection may occur, requiring expensive and time-consuming tower climbs to correct the situation. In addition, as the density of RF connector ports 532 is increased, so is the possibility that a technician will connect one or more of the jumper cables to the wrong RF connector ports 532, again requiring tower climbs to correct. This problem may be exacerbated by the fact that the denser the array of RF connector ports 532 the less room there is on the bottom end cap for labels that assist the technician in the installation process.

Pursuant to embodiments of the present inventive concepts, base station antennas are provided which have one or more radios mounted on the back of the antenna to provide an antenna assembly. The base station antennas included in these antenna assemblies may have arrays of connector ports (or other connections) for the radios mounted on the rear surface of the base station antenna, which may provide both design and performance advantages. In some embodiments, the base station antennas may be designed so that radios manufactured by any original equipment manufacturer may be mounted on the back of the antenna. This allows cellular operators to purchase the base station antennas and the radios mounted thereon separately, providing greater flexibility to the cellular operators to select antennas and radios that meet operating needs, price constraints and other considerations. Various embodiments of these base station antennas will be discussed in further detail with reference to FIG. 4.

Figure 4A:
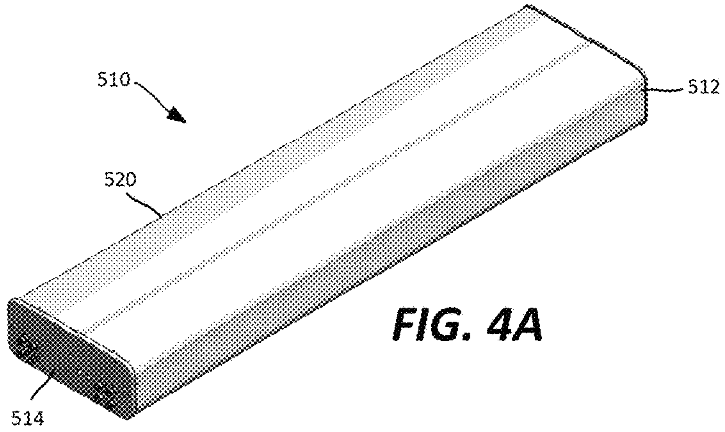
FIG. 4A is a front perspective view of a base station antenna according to further embodiments of the present inventive concepts.
Figure 4B:
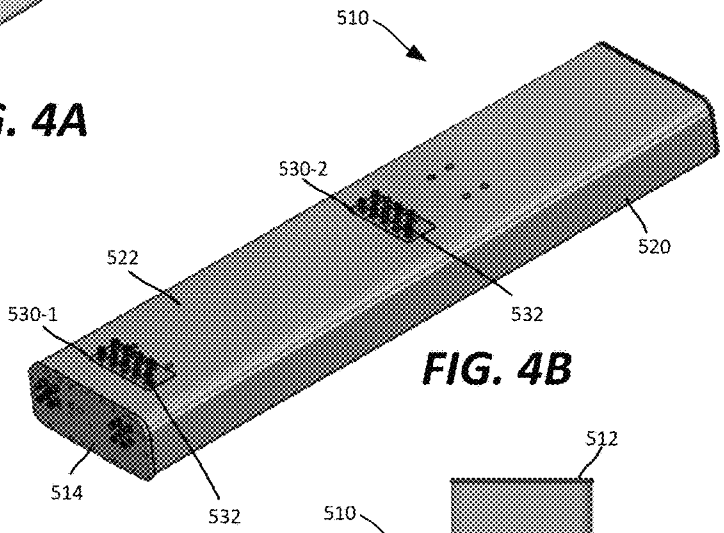
FIG. 4B is a back perspective view of the base station antenna of FIG. 4A.
Figure 4C:
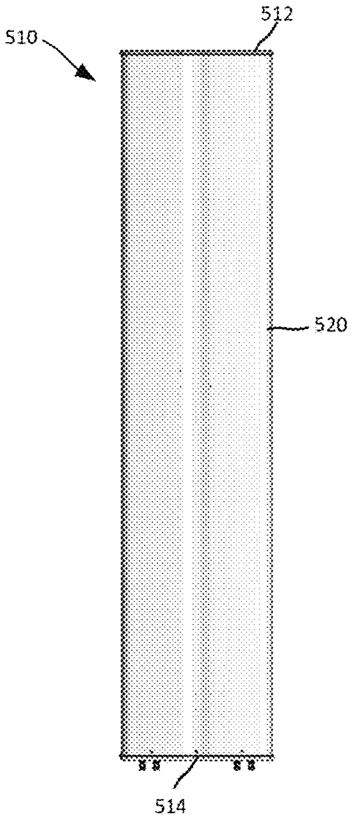
FIG. 4C is a front view of the base station antenna of FIG. 4A.
Figure 4D:
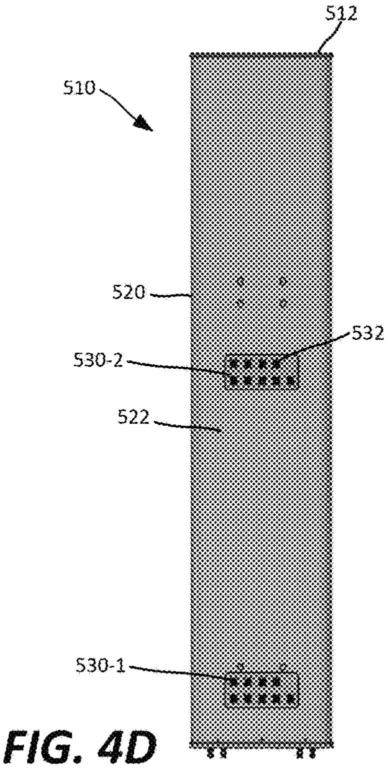
FIG. 4D is a back view of the base station antenna of FIG. 4A.

Turning first to FIGS. 4A-4D, a base station antenna 510 is depicted that is designed so that a pair of cellular radios may be mounted on the back side of the housing thereof. In particular, FIGS. 4A and 4B are a front perspective view and a rear perspective view, respectively, of the base station antenna 510, while FIGS. 4C and 4D are a front view and a rear view, respectively, of the base station antenna 510.

As shown in FIG. 4A-4D, the base station antenna 510 includes a top end cap 512, a bottom end cap 514 and a radome 520. A back surface 522 of the radome 520 includes a pair of openings. A connector plate 530 is mounted in each opening, and a plurality of RF connector ports 532 that form an array 534 of connector ports 532 are mounted in each connector plate 530. In the depicted embodiment, each connector plate 530 has a total of nine connector ports 532 mounted therein. Each connector port 532 may comprise an RF connector port that may be connected to an RF port on a radio by a suitable connectorized cable such as, for example, a coaxial jumper cable. In one example embodiment, each RF connector port 532 may comprise a double-sided connector port so that respective coaxial jumper cables may be connected to each side of each RF connector port 532. Accordingly, first coaxial jumper cables (not shown) that are external to the antenna 510 may extend between each RF connector port 532 and a respective RF connector port on a radio (not shown) that is mounted on the back of the antenna 510, and second coaxial jumper cables (not shown) that are internal to the antenna 510 may extend between each RF connector port 532 and one or more internal components of the antenna 510.

Figure 5A:
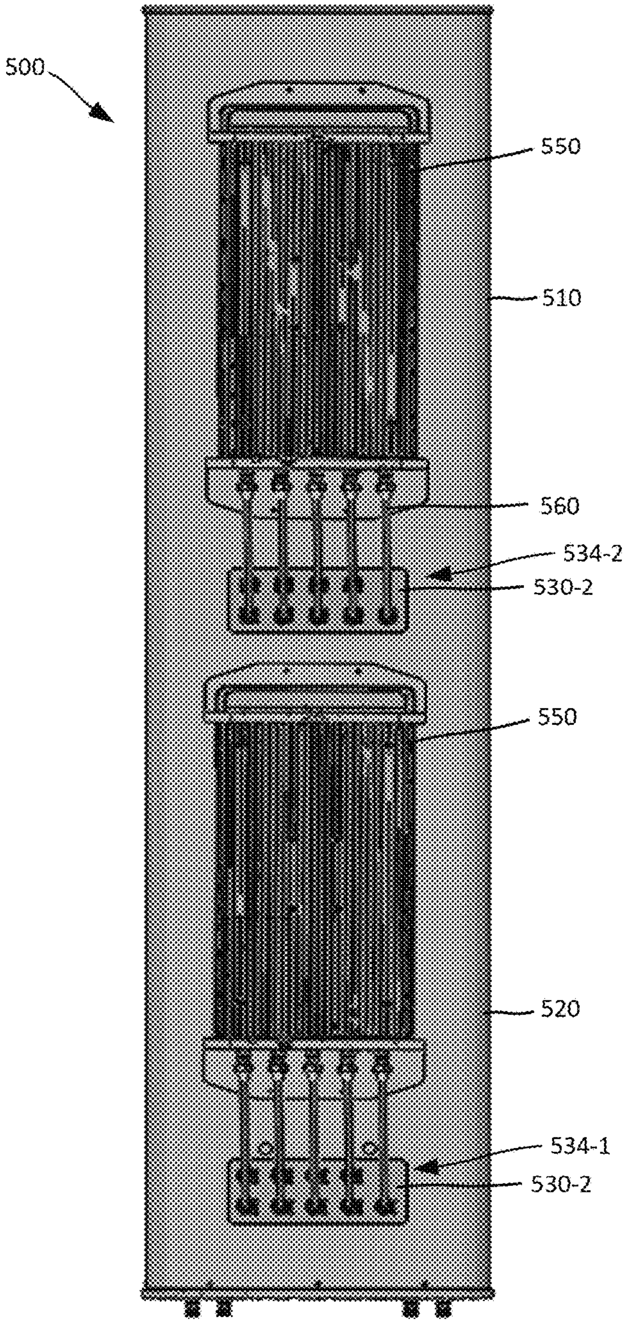
FIG. 5A is a back view of the base station antenna of FIGS. 4A-D with a pair of active radios mounted thereon to provide an antenna assembly.
Figure 5B:
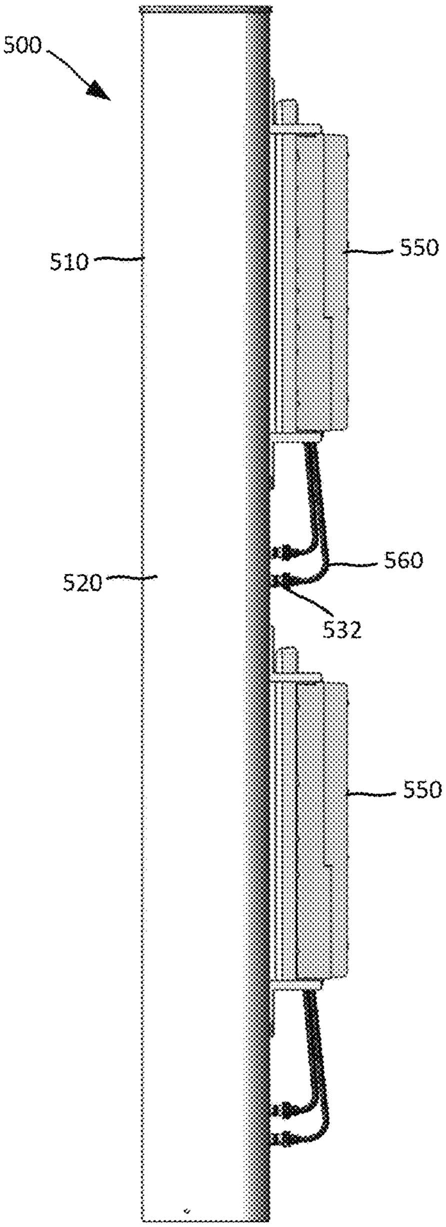
FIG. 5B is a side view of the antenna assembly of FIG. 5A.
Figure 5C:
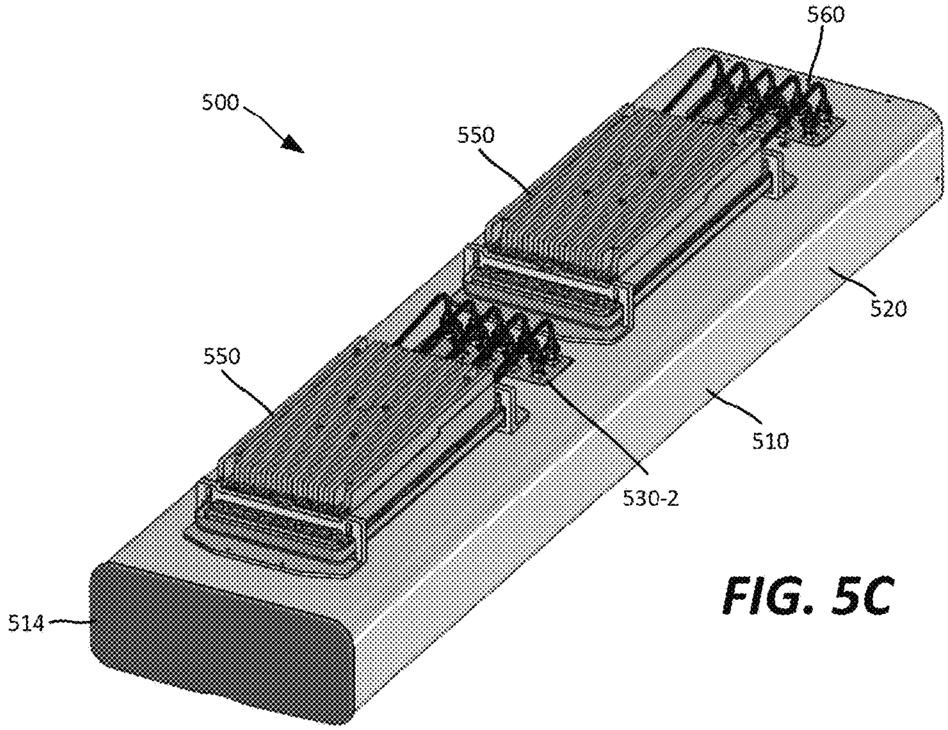
FIG. 5C is a back perspective view of the antenna assembly of FIG. 5A.
Figure 5D:
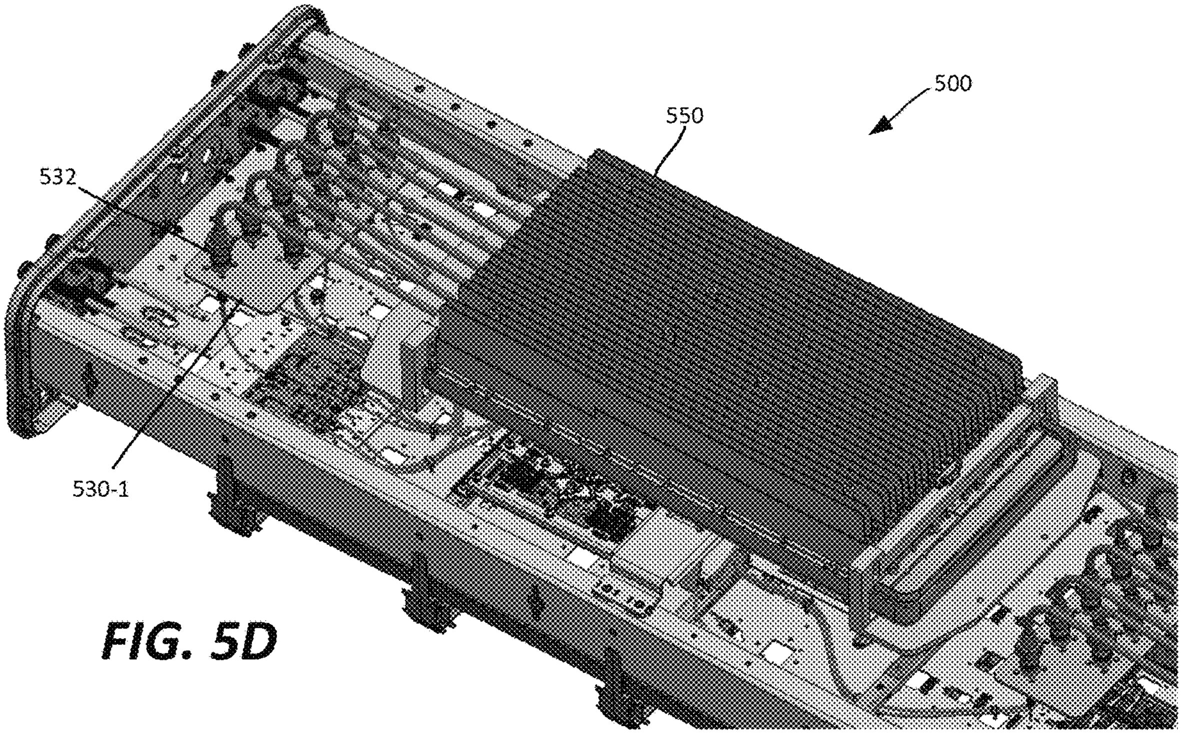
FIG. 5D is a partial back perspective view of the antenna assembly of FIG. 5A with the radome removed.

FIGS. 5A-5D are various views that illustrate the base station antenna 510 of FIGS. 4A-4D after two beamforming radios 550 have been mounted on the back side of the antenna to provide an antenna assembly 500. In particular, FIG. 5A is a back view of the antenna assembly 500, FIG. 5B is a side view of the antenna assembly 500, FIG. 5C is a back perspective view of the antenna assembly 500, and FIG. 5D is a partial back perspective view of the antenna assembly 500 with the radome 520 removed.

Referring to FIGS. 5A-5D, it can be seen that the antenna assembly 500 includes the base station antenna 510 of FIGS. 4A-4D and a pair of cellular radios 550 that are mounted on the back surface of the radome 520. Nine coaxial jumper cables 560 extend between nine connector ports 552 that are provided on each radio 550 and the nine connector ports 532 provided on a corresponding one of the connector plates 530.

As discussed above, in the antenna assembly 500 according to embodiments of the present inventive concepts, two arrays 534 of RF connector ports 532 are provided on the back surface of the base station antenna 510. One of the arrays 534 of connector ports 532 may comprise the RF connector ports 532 for the four column planar array 240 of second mid-band radiating elements 242 and the other array 534 of RF connector ports 532 may comprise the RF connector ports 532 for the four column planar array 250 of high-band radiating elements 252. As shown in FIGS. 5A-5D, this allows the RF connector ports 552 on each of the beamforming radios 550 to be connected to their corresponding RF connector ports 532 on the base station antenna 510 by very short coaxial jumper cables 560. This may result in as much as a 2-3 dB improvement in RF cable losses, which may provide a significant increase in throughput.

Additionally, by mounting the beamforming radios 550 directly onto the base station antenna 510, the cellular operator may avoid leasing tower costs for the two radios 550, as leasing costs are typically based on the number of elements that are separately mounted on an antenna tower. Additionally, by moving eighteen of the RF connector ports 532 to the back of the antenna 510, the number of RF connector ports 532 mounted on the bottom end cap 514 may be reduced significantly (e.g., to eight RF connector ports in the example set forth above). This may make it easier for technicians to properly install the jumper cables 560, and leaves plenty of room for easy to read labels that aid installation.

Moreover, in some embodiments, the base station antenna 510 may be designed so that radios 550 manufactured by a wide variety of different equipment manufacturers may be mounted thereon. For example, the frame of the base station antenna 510 (which is located inside the radome 520) may include rails or other vertically extending members along the back surface thereof that the radios 550 may be mounted on. This may allow a cellular operator to order a base station antenna 510 according to embodiments of the present inventive concepts from a first vendor, a first beamforming radio 550 from a second vendor and a second beamforming radio 550 from a third vendor and then combine the three together to form the antenna assembly 500. This provides significant flexibility to the cellular operator to select vendors and/or equipment that best suit the needs of the cellular operator.

While FIGS. 4A-5D illustrate embodiments in which the RF connector ports 532 for both beamforming radios 550 are mounted on connector plates on the rear surface of base station antenna assemblies 500 and 500A-500C, it will be appreciated that embodiments of the inventive concepts are not limited thereto. For example, any of these embodiments may be modified so that the RF connector ports 532 for at least one of the two beamforming radios 550 are mounted on the bottom end cap 514 of the base station antenna 510.

Figure 6:
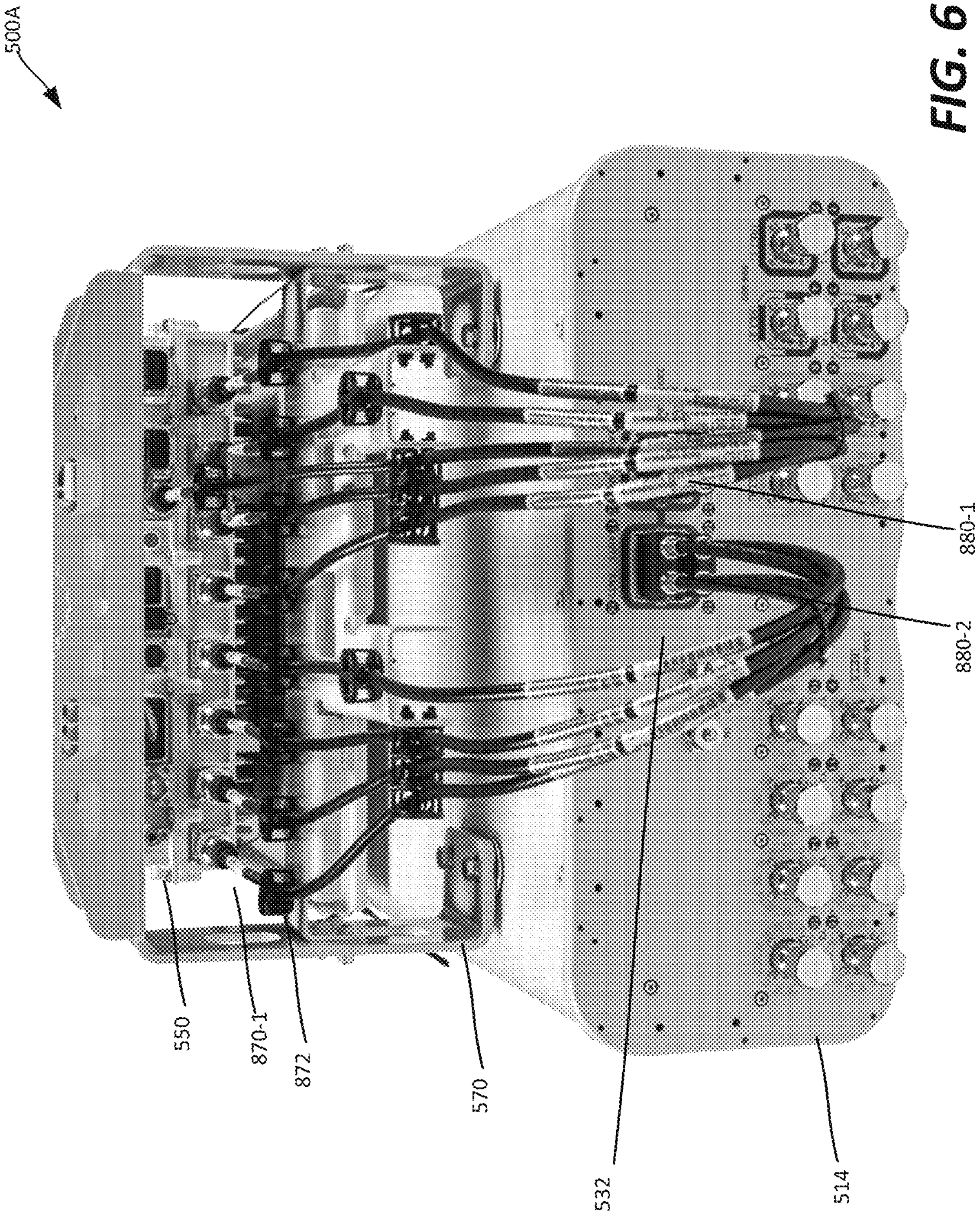
FIG. 6 is an end view of an antenna assembly that includes a base station antenna and a beamforming radio.

One example of such a base station assembly 500A in which the RF connector ports 532 for at least one beamforming radios 550 are mounted on the bottom end cap 514 of the base station antenna 510 is illustrated in FIG. 6. As is further shown in FIG. 6, while a first end of each jumper cable 870 may be received at a respective connector of the beamforming radio 550, the second end of each jumper cable 870 may be connected to one or more cluster connectors 880. A cluster connector may comprise a plurality of connectors that are fixedly pre-mounted in a common plate. In the embodiment shown in FIG. 6, two cluster connectors 880-1, 880-2 are provided, with five of the jumper cables 870 connected to the first cluster connector 880-1 and the remaining four jumper cables 870 connected to the second cluster connector 880-2. The RF ports 532 on base station antenna 510 may be arranged to mate with the two cluster connectors 880, and each cluster connector 880 may be pushed onto a corresponding group of four or five RF connector ports 532 in order to quickly and easily connect the jumper cables 870 to the base station antenna 510. Suitable cluster connectors are disclosed in U.S. patent application Ser. No. 16/375,530, filed Apr. 4, 2019, the entire content of which is incorporated herein by reference. It will also be appreciated that jumper cable assemblies that have cluster connectors on both ends of the cables may be used in other embodiments or alternatively be used to provide the RF connections between the beamforming radios 550 and the base station antenna 510.

The antenna assemblies according to embodiments of the present inventive concepts, such as antenna assemblies 500 and 500A, may also be designed so that the radios 550 may be field-replaceable. Herein, a field-replaceable radio refers to a radio 550 that is mounted on a base station antenna that can be removed and replaced with another radio while the base station antenna is mounted for use on, for example, an antenna tower. As is seen in FIG. 6, mounting brackets 570 that attach between the antenna assembly 500 and the antenna tower (or other mounting structure) may connect to the base station antenna 510 as opposed to connecting to the radios 550. Additionally, as shown in FIG. 6, the mounting brackets 570 may be spaced apart from the radios 550 so that a technician can access and remove the radios 550 while the antenna 510 is mounted on the antenna tower. In some embodiments, cable guides 872 may be provided within the mounting brackets 570. The cable guides 872 may retain the jumper cables 870, for example during replacement or repair of the radio 550.

The various embodiments of the antenna assembly 500 illustrated with respect to FIGS. 4A-6 use external jumper cables 560/870 to connect the RF connector ports 552 on the beamforming radios 550 to the RF connector ports 532 that are mounted on the back surface of the radome 520 or the bottom end cap 514. The external jumper cables 560/870 have connectors on each end, which may be of the same type or of different types. The present disclosure is not limited to the use of such jumper cables, however. Pursuant to some embodiments of the present inventive concepts, the RF connectors 532 included in the antenna assembly 500 may be replaced with access holes.

Figure 7:
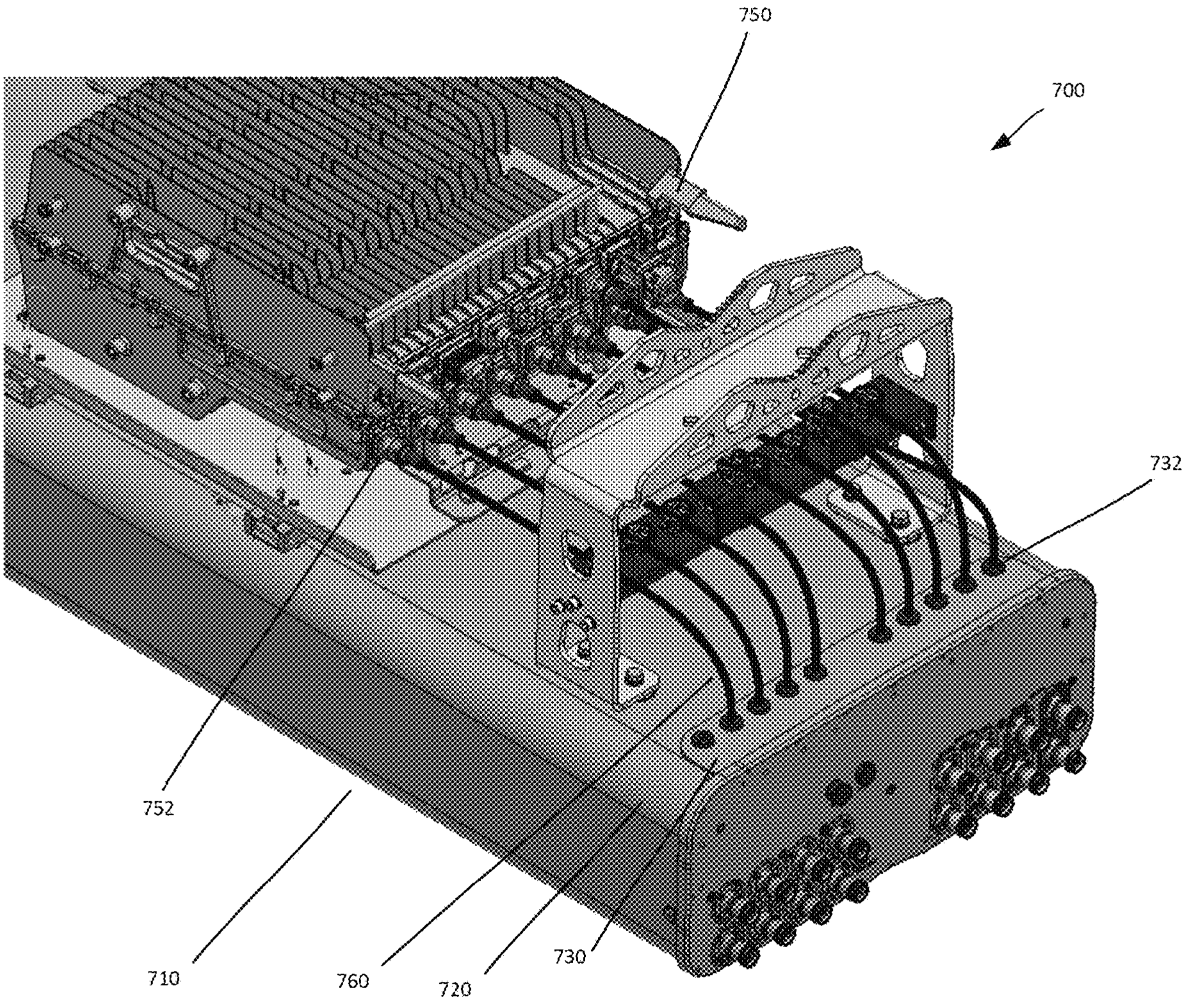
FIG. 7 is an end view of an antenna assembly that includes a base station antenna and a beamforming radio.

FIG. 7 is a back view of an antenna assembly 700 that includes such a design. As shown in FIG. 7, the antenna assembly 700 includes a base station antenna 710 that at least one beamforming radio 750 mounted on a rear surface thereof. The radome 720 of antenna 710 includes at least one panel 730 that has access openings 732 therein. Each access opening 732 may be surrounded by a gland or seal to provide weatherproofing. Pigtail cables 760 may be factory-coupled (e.g., soldered) to internal components within the base station antenna 710 and may extend from through a corresponding access hole 732 to connect with a respective RF connector port 752 on the radio 750. As used herein, the term "pigtail cables" includes a cable with a connector on one end that may be factory-coupled to a component within the base station antenna 710, and may not be field-replaceable.

Figure 8A:
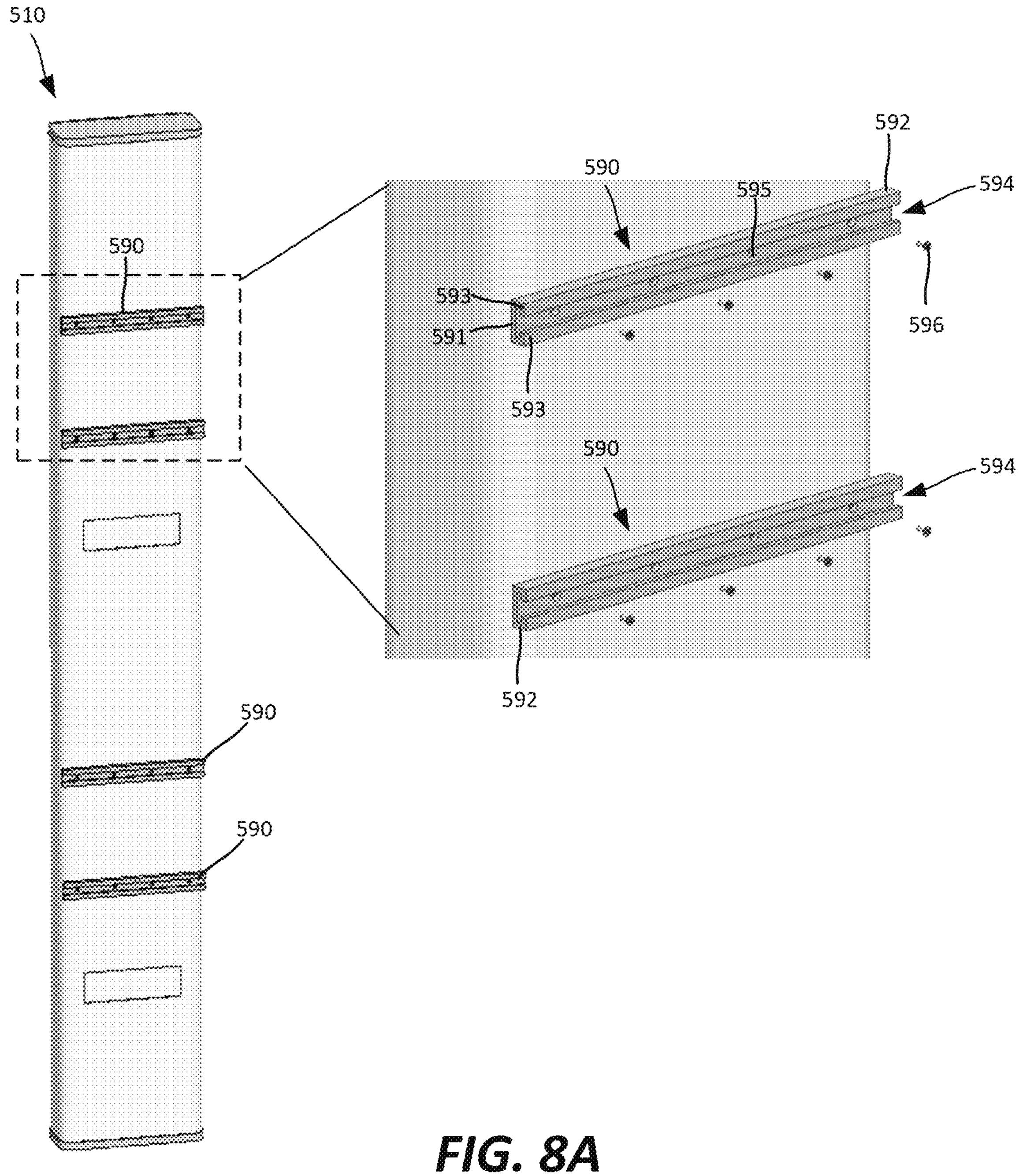
FIG. 8A is a rear perspective view of a base station antenna illustrating how guide rails may be mounted thereon that are used to mount beamforming radios on the back of the antenna.

Pursuant to still further embodiments of the present inventive concepts, methods of installing beamforming radios on base station antennas to provide base station assemblies are provided. Methods of installation are provided that are suitable for factory installation as well as methods for field installing (or replacing) beamforming radios on base station antennas. Referring to FIG. 8A, in some embodiments, one or more guide rails 590 may be mounted on the rear surface of the base station antenna 510. For example, the frame of the base station antenna 510 may have support brackets (not shown) that extend between rearwardly-extending sidewalls of the frame, and each guide rail 590 may be mounted through the radome 520 onto one of the support brackets using screws or other attachment mechanisms. In the embodiment shown in FIG. 8A, a pair of horizontally-oriented guide rails 590 is provided for each beamforming radio 550.

As shown in FIG. 8A, each guide rail 590 may be implemented using a channel iron that has a front plate 591, rearwardly extending top and bottom walls 592, and lips 593 that extend downwardly and upwardly from the respective top and bottom walls 592 so that the guide rail 590 has a generally C-shaped transverse cross-section that defines an interior slot 594. Mounting holes 595 may be provided through the front wall 591 that receive screws or other fasteners 596 that are used to mount each guide rail 590 on the support plate or other structural component (not shown) of base station antenna 510. The guide rails 590 may be formed of aluminum or steel in example embodiments.

Figure 8D:
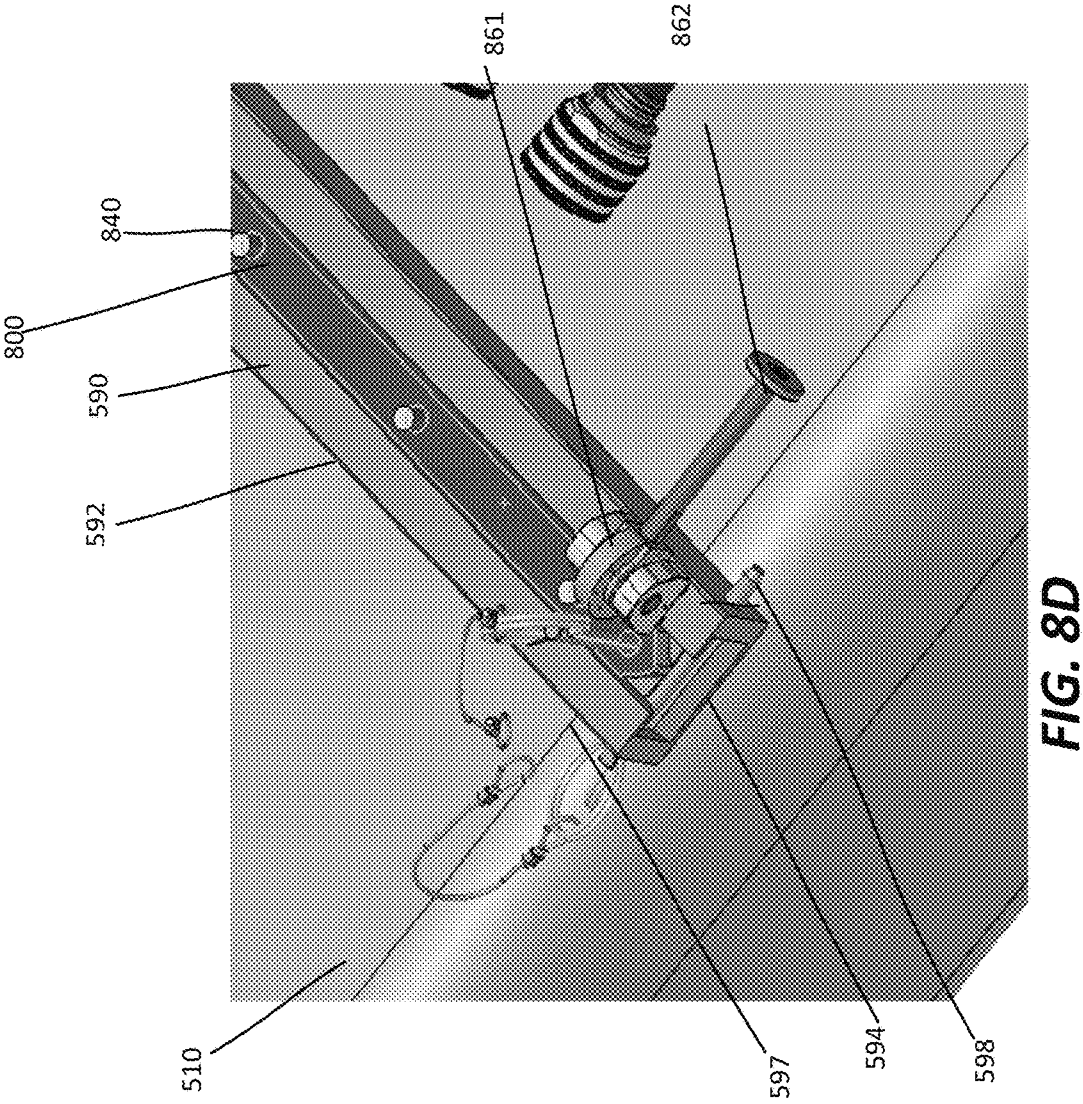
FIG. 8D is an enlarged view of a portion of FIG. 8C showing how the radio support plates may be locked in place after the radio support plates are mounted on the base station antenna.
Figure 8B:
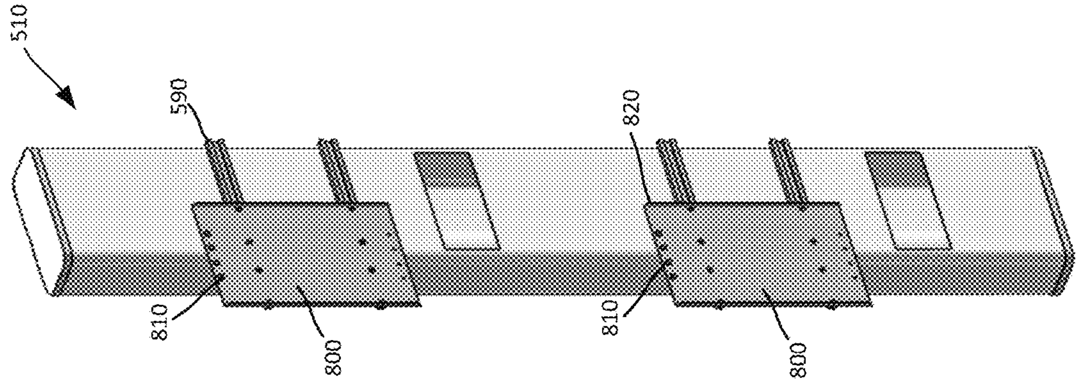
FIG. 8B is a rear perspective view of a base station antenna of FIG. 8A illustrating how radio support plates may be mounted on the antenna using the guide rails.

As shown in FIG. 8B, radio support plates 800 may be provided that are configured for mounting on the guide rails 590. Each radio support plate 800 may comprise, for example, a substantially planar metal plate that has mounting holes 810 therein. The radio support plates 800 need not be planar, however, and may include, for example, rearwardly-extending lips 820 or other non-planar features (e.g., the plate radio support 800 may be a corrugated plate). The size of each radio support plate 800 and the location of the mounting holes 810 may be customized based on the design of the beamforming radio 550 that is to be mounted on the base station antenna 510. Thus, different radio support plates 800 may be provided for different beamforming radio manufacturers and/or for different beamforming radio 550 models. For example, the beamforming radios 550 may include top and bottom mounting flanges (not shown) that have openings therein. The openings may be aligned with the mounting holes 810 on the radio support plates 800 so that each beamforming radio 550 may be mounted on a respective radio support plate 800 using screws, bolts or other fasteners.

Figure 8C:
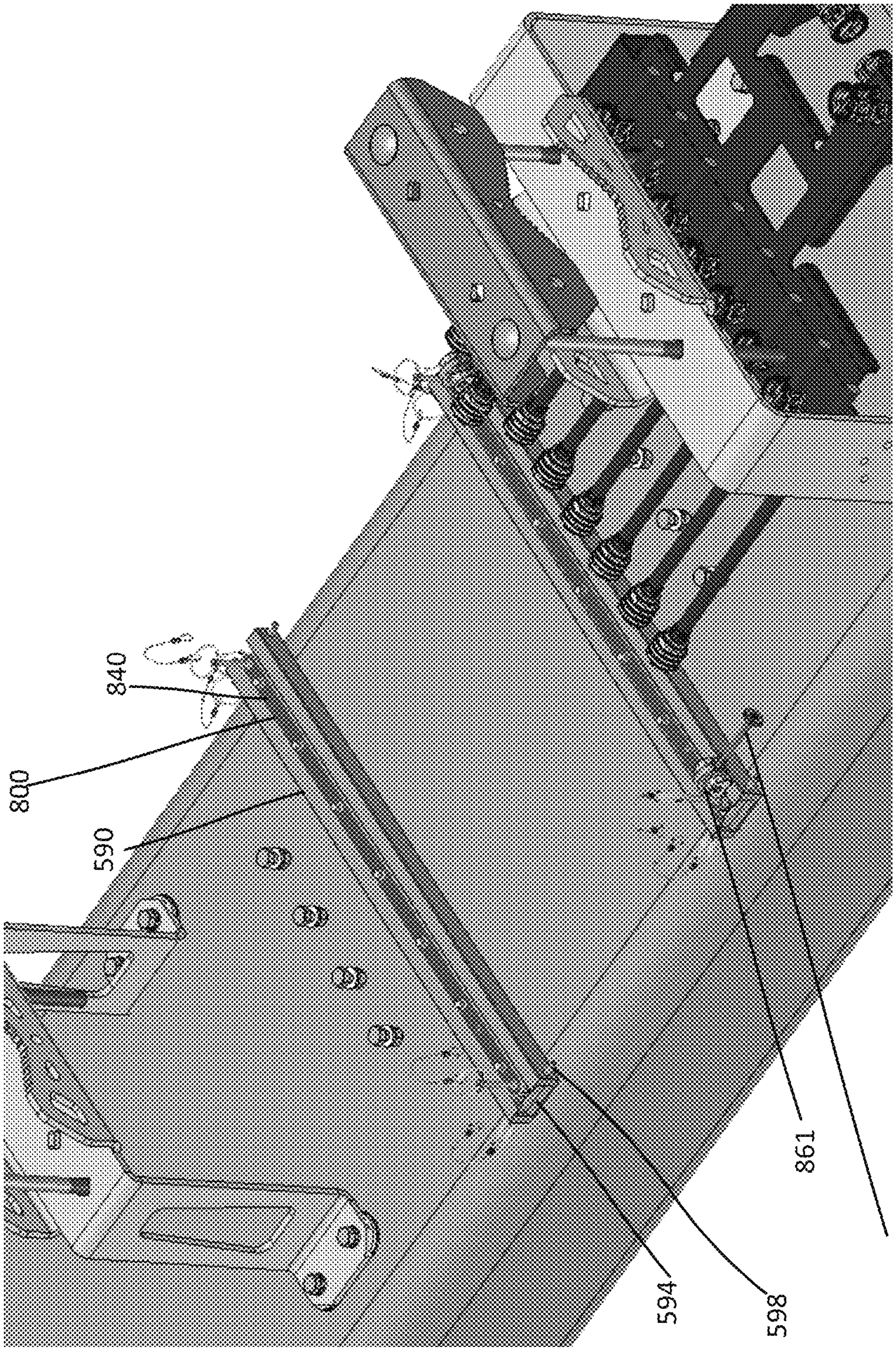
FIG. 8C is an perspective view illustrating how guide structures on the radio support plate may be received within one of the guide rails mounted on the antenna.

FIG. 8C is a perspective view of the rear of the base station antenna 510. Referring to FIG. 8C, one or more guide structures 830 may be mounted on the surface of the radio support plate 800 that is configured to face the base station antenna 110. The guide structures may be mounted using, for example, screws or bolts. In the depicted embodiment, each guide structure 830 comprises a rod 840. The radio support plate 800 and the beamforming radio 550 are not shown in FIGS. 8C and 8D to better describe aspects of the rod 840 and the guide rails 590.

The rod 840 is sized to be received in the slot 594 that is defined between the front plate 591, top and bottom walls 592 and lips 593 of one of the guide rails 590. Accordingly, a radio support plate 800 having guide structures 830 in the form of the rod 840 may be mounted on one or more guide rails 590 by sliding the radio support plate 800 laterally parallel to the guide rail(s) 590 so that the rod 840 is received within the slots 594 in the guide rail(s) 590. As best seen in FIG. 8D, which is an enlarged view of a portion of FIG. 8C, pin through holes 597 may be provided in the top and bottom walls 592 at each end of the guide rails 590. The pin through holes 597 may be dimensioned to receive a locking pin 598. In some embodiments, the rod 840 may have corresponding through holes 841 that are positioned along a length of the rod 840 such that, when the rod 840 is slid into position within the slot 594, the corresponding through holes 841 of the rod 840 align with the pin through holes 597 of the top and bottom walls 592. As such, the locking pin 598 may be received through both the guide rail 590 and the rod 840.

Alternatively, the rod 840 may be dimensioned to be slightly shorter in length than the guide rail 594, and the corresponding through holes may be omitted from the rod 840. During installation, a first locking pin 598 at a first end of the guide rail 590 may be inserted through the pin through holes 597 in both the top and bottom walls 592 at the first end of the guide rail 594. The radio support plate 800 may be mounted onto the base station antenna 510 by sliding the rod 840 into the slot 594 from the second end of the guide rail 590 until the rod 840 abuts the locking pin. Once the radio support plate 800 is in place, a second locking pin 598 may be inserted through the pin through holes 597 at the second end of the guide rail 590. Once the rods 840 on the radio support plate 800 have been fully inserted into the respective slots 594 of the guide rails 590, and the first and second locking pins 598 have been inserted in the pin through holes 597 at each end of the guide rails 590, lateral movement of the radio support plate 800 (and the radio 550 mounted thereon) relative to the base station antenna 510 is hindered and/or effectively prevented.

In some embodiments, machining tolerances of the guide rails 590 and/or the rods 840 of the radio support plate may result in a thickness of the rod being less than a distance from the front plate 591 to the inner surface of the lips 593 of the guide rail. Moreover, even where machining tolerances are controlled, the thickness of the rod 840 may be less than the corresponding dimension of the slot 840 so as to permit relatively easy sliding of the rods 840 relative to the guide rails 590. Although lateral movement is prevented by the locking mechanisms, the thickness of the rod 840 relative to the guide rail 590 may create a potential for slight movement of the radio support plate 800 toward and away from the base station antenna 510. This movement, which may be exacerbated by wind loads at the installation site, may result in degradation of either internal components of the beamforming radio 550 and or the connectors electrically connecting the beamforming radio 550 with the base station antenna 510. To prevent such movement, a locking mechanism 860 may be provided. As shown, the locking mechanism 860 may include an offset cam 861 that is rotatable into position via lever 862. After sliding of the rods 840 of the radio support plate 800 into the guide rails 590, the lever 862 may be rotated, causing the offset cam 861 to press rod 840 into contact with the front plate 591 of the guide rail 590. Such contact, which is maintained by the offset cam 861, hinders and/or effective prevents the movement of the radio support plate 800 relative to the base station antenna 510.

In some aspects, the rod 840 may be formed of a plastic or other material selected to reduce or prevent the formation of passive intermodulation interference (PIM) products. PIM is a form of electrical interference that may occur when two or more RF signals encounter non-linear electrical junctions or materials along an RF transmission path. Such non-linearities may act like a mixer causing the RF signals to generate new RF signals at mathematical combinations of the original RF signals. PIM may result from inconsistent metal-to-metal contacts along an RF transmission path and/or the RF reception path, particularly when such inconsistent contacts are in high current density regions of the paths such as inside RF transmission lines, inside RF components, or on current carrying surfaces of an antenna. Such inconsistent metal-to-metal contacts may occur, for example, because of contaminated and/or oxidized signal carrying surfaces, loose connections between two connectors, metal flakes or shavings inside RF components or connections and/or poorly prepared soldered connections (e.g., a poor solder termination of a coaxial cable onto a printed circuit board). Other PIM may result from a metallic surface located within the transmission range of the antenna, such as a tower or mounting structure on which the antenna is mounted, or stationary or moving structures or objects nearby. The non-linearities that give rise to PIM may be introduced at the time of manufacture, during installation, or due to electromechanical shift over time due to, for example, mechanical stress, vibration, thermal cycling, and/or material degradation. As such, embodiments of the present inventive concepts include those in which the rod 840 and/or other components of the radio support plate 800 or guide rail 590 are formed from non-metallic materials.

It will be appreciated that a wide variety of other guide structures could be used. It will also be appreciated that in still further embodiments the guide structures may be mounted on the rear surface of the base station antenna 510 and the guide rails 590 may be mounted on the radio support plate 800.

Figure 8E:
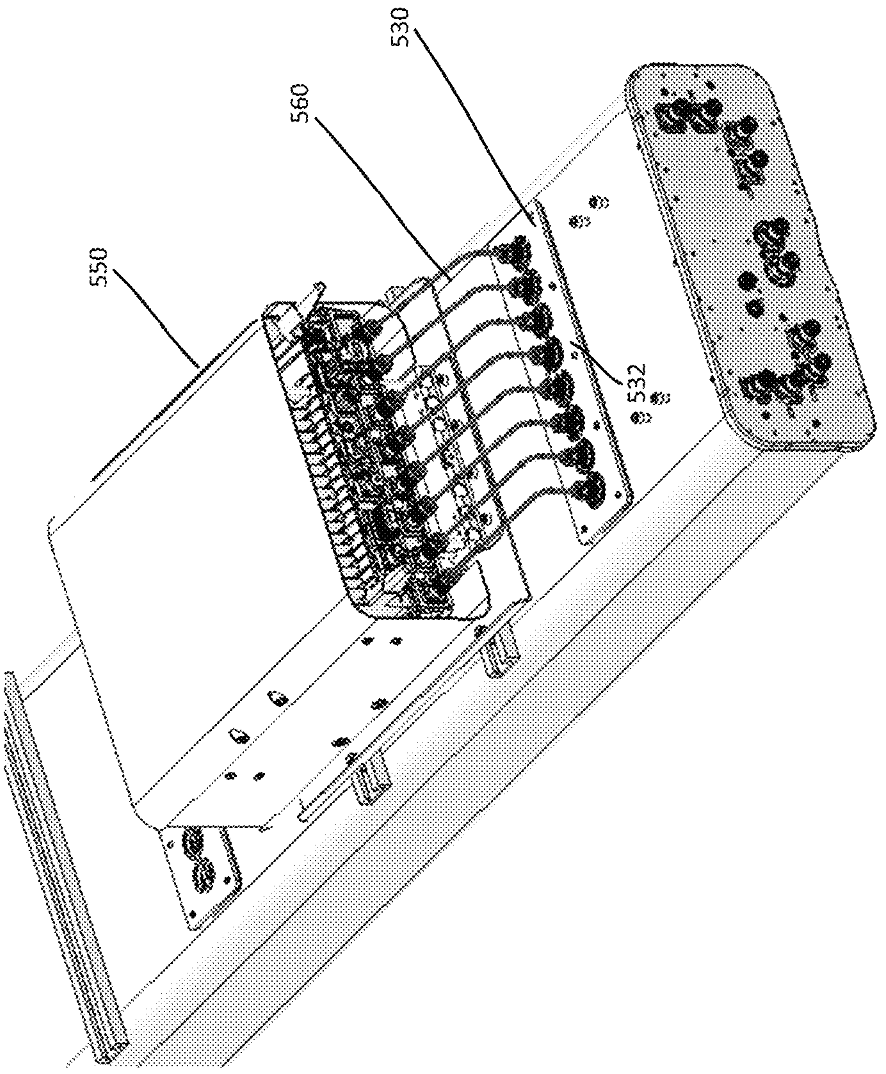
FIG. 8E is an enlarged partial view illustrating the jumper cables that connect the beamforming radio to the base station antenna.

Referring to FIG. 8E, jumper cables 560 may then be installed that electrically connect the connector ports 552 on each beamforming radio 550 to respective RF connector ports 532 on the base station antenna 510, though the arrangement of FIGS. 8A-8E may be used with any cabling between the beamforming radio 550 and the base station antenna 510, including those illustrated in FIGS. 6 and 7.

According to the present disclosure, the beamforming radios 550 may be readily replaced in the field. As is well known, base station antennas are typically mounted on towers, often hundreds of feet above the ground. Base station antennas may also be large, heavy and mounted on antenna mounts that extend outwardly from the tower. As such, replacing base station antennas may be difficult and expensive. The beamforming radios 550 of base station antenna assembly 500 may be field replaceable without the need to detach the base station antenna 510 from an antenna mount. Instead, the jumper cables 560 that extend between the base station antenna 510 and the beamforming radios 550 may be removed, and any stop mechanisms such as stop bolts or latches that are used to hold each radio support plate 800 with a beamforming radio 550 mounted thereon in place (to prevent lateral movement of the radio support plate 800 relative to the radio 550) on the base station antenna 510 may also be removed or unlatched. Each radio support plate 800 with a beamforming radio 550 mounted thereon may then be removed simply by sliding the radio support plate 800 laterally until the guide structure(s) 830 are free of the slots 594 in the respective guide rails 590. Then, a different beamforming radio 550 that is mounted on an appropriate radio support plate 800 may be positioned adjacent the guide rails 590 so that the guide structures 830 on the radio support plate 800 are aligned with the guide rails 590. The installer may then move the new radio support plate 800 laterally so that the guide structures 830 are captured by the respective guide rails 590 on the base station antenna 510. Once the new radio support plate 800 (with new beamforming radio 550 mounted thereon) is fully installed on the guide rails 590, the above-discussed stop/latching mechanism(s) may be engaged to prevent lateral movement of the new radio support plate 800 relative to the base station antenna 510. It should be noted that in some embodiments the new beamforming radio 550 may be installed without the use of any tools or with only a screwdriver.

In some of the example embodiments provided herein, the base station antenna 510 is configured so that the first array 534-1 of RF connector ports 532 is mounted near the bottom of the back surface of the radome 520, and the second array 534-2 of RF connector ports 532 is mounted near the middle of the back surface of the radome 520. The beamforming radios 550 are mounted above their corresponding arrays 534 of RF connector ports 532 in this design. It will be appreciated, however, that embodiments of the present inventive concepts are not limited to this configuration. For example, FIGS. 9A-9C are schematic back views illustrating alternative arrangements for the arrays 534 of RF connector ports 532 that may be employed in base station antennas according to further embodiments of the present inventive concepts.

Figure 9A:
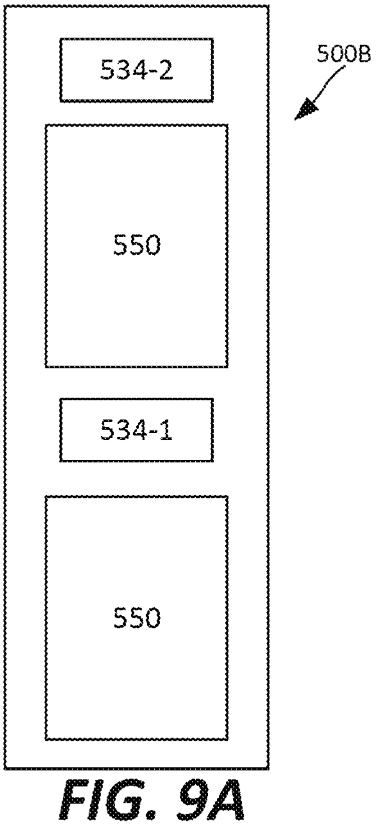
FIGS. 9A-9C are schematic back views illustrating alternative arrangements for the connector port arrays included in the base station antenna of FIGS. 4A-4D.
Figure 9B:
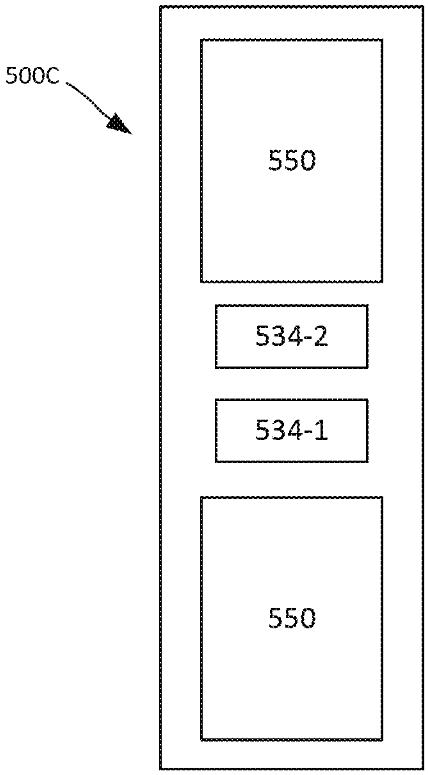
Figure 9C:
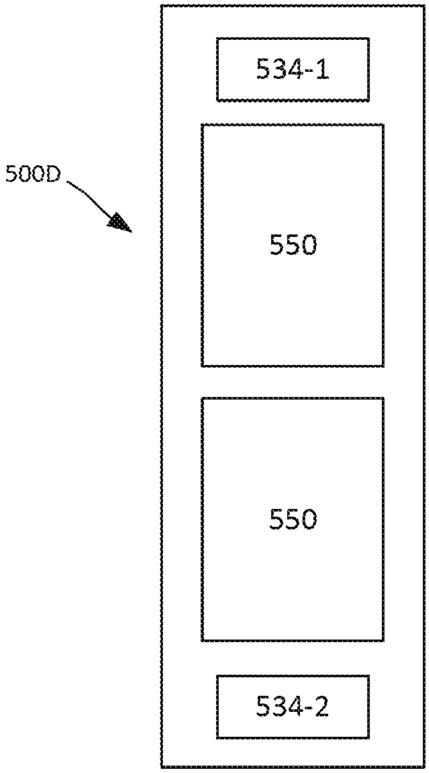

As shown in FIG. 9A, in a first alternative embodiment, an antenna assembly 500B is provided in which the first array 534-1 of RF connector ports 532 may be mounted near the top of the back surface of the antenna 510, and the second array 534-2 of RF connector ports 532 may be mounted near the middle of the back surface of the antenna 510. In this embodiment, the beamforming radios 550 may be mounted below their corresponding arrays 534 of RF connector ports 532. As shown in FIG. 9B, in a second alternative embodiment, an antenna assembly 500C is provided in which the first and second arrays 534-1, 534-2 of RF connector ports 532 may each be mounted near the middle of the back surface of the antenna 510, with one beamforming radio 550 mounted above the arrays 534 of RF connector ports 532 and the other beamforming radio 550 mounted below the arrays 534 of RF connector ports 532. As shown in FIG. 9C, in a third alternative embodiment, an antenna assembly 500D is provided in which the first array 534-1 of RF connector ports 532 may be mounted near the top of the back surface of the antenna 510, and the second array 534 of RF connector ports 532 may be mounted near the bottom of the back surface of the antenna 510, and the two beamforming radios 550 may be mounted in between the two arrays 534 of RF connector ports 532.

It will be appreciated that many modifications may be made to the antenna assemblies described above without departing from the scope of the present inventive concepts. For example, while some of the above embodiments illustrate two radios mounted on the back of the antenna, it will be appreciated that in other embodiments different numbers of radios may be mounted on the antenna. For example, one, three, four or more radios may be mounted on the back of the antenna in other embodiments depending, for example, on cellular operator requirements. It will also be appreciated that while the beamforming antennas are shown mounted on the back of the antennas described above, embodiments of the present inventive concepts are not limited thereto. For example, in other embodiments, the radios that connect to the passive linear arrays may be mounted on the back of the antenna. However, in many instances it may be advantageous to mount the beamforming radios on the back of the antenna (which typically operate as time division duplexed radios) because these radios may be smaller and/or lighter weight than the radios that feed the passive, frequency division duplexed linear arrays, and as the beamforming radios typically have more RF connector ports, and hence mounting the beamforming radios on the back of the antenna and moving the associated RF connector ports to the back of the antenna as well frees up more space on the bottom end cap, simplifying the installation process.

Embodiments of the present inventive concepts have been described above with reference to the accompanying drawings, in which embodiments of the inventive concepts are shown. The inventive concepts may, however, be embodied in many different forms and should not be construed as limited to the embodiments set forth herein. Rather, these embodiments are provided so that this disclosure will be thorough and complete, and will fully convey the scope of the inventive concepts to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present inventive concepts. As used herein, the term "and/or" includes any and all combinations of one or more of the associated listed items.

It will be understood that when an element is referred to as being "on" another element, it can be directly on the other element or intervening elements may also be present. In contrast, when an element is referred to as being "directly on" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

The terminology used herein is for the purpose of describing particular embodiments only and is not intended to be limiting of the inventive concepts. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, operations, elements, and/or components, but do not preclude the presence or addition of one or more other features, operations, elements, components, and/or groups thereof.

Aspects and elements of all of the embodiments disclosed above can be combined in any way and/or combination with aspects or elements of other embodiments to provide a plurality of additional embodiments.

That which is claimed is:

1. A base station antenna assembly, comprising:

a base station antenna having a frame and a radome that covers the frame; and a first radio mounted on a radio support plate, wherein a first guide rail is mounted on one of the base station antenna and the radio support plate and a first cooperating rod is mounted on the other of the base station antenna and the radio support plate, and wherein the first guide rail and the first cooperating rod are configured so that when the first cooperating rod is received within a slot in the first guide rail the radio support plate is mounted on the base station antenna.

2. The base station antenna assembly of claim 1, further comprising a first locking pin, wherein the first guide rail comprises top and bottom walls each having a first pin through hole therein which is dimensioned to receive the first locking pin.

3. The base station antenna assembly of claim 2, wherein the first cooperating rod comprises first pin through holes therein which are dimensioned to receive the first locking pin.

4. The base station antenna assembly of claim 2, further comprising a second locking pin, wherein the top and bottom walls each have a second pin through hole therein which is dimensioned to receive the second locking pin.

5. The base station antenna assembly of claim 4, wherein the first cooperating rod comprises second pin through holes therein which are dimensioned to receive the second locking pin.

6. The base station antenna assembly of claim 1, wherein the first guide rail is mounted on the base station antenna and the first cooperating rod is mounted on the radio support plate opposite the first radio.

7. The base station antenna assembly of claim 1, wherein the first cooperating rod is dimensioned to be shorter in length than the first guide rail.

8. The base station antenna assembly of claim 7, further comprising first and second locking pins, wherein the first guide rail comprises top and bottom walls each having pin through holes therein which are dimensioned to receive the first and second locking pins.

9. A base station antenna assembly, comprising:

a base station antenna having a frame and a radome that covers the frame;

a first radio mounted on a radio support plate;

a first guide rail mounted on the base station antenna and having a slot therein; and a first cooperating rod mounted on the radio support plate, wherein the first guide rail and the first cooperating rod are configured so that when the first cooperating rod is received within the slot in the first guide rail the radio support plate is mounted on the base station antenna.

10. The base station antenna assembly of claim 9, further comprising a first locking pin, wherein the first guide rail comprises top and bottom walls each having a first pin through hole therein which is dimensioned to receive the first locking pin.

11. The base station antenna assembly of claim 10, wherein the first cooperating rod comprises first pin through holes therein which are dimensioned to receive the first locking pin.

12. The base station antenna assembly of claim 10, further comprising a second locking pin, wherein the top and bottom walls each have a second pin through hole therein which is dimensioned to receive the second locking pin.

13. The base station antenna assembly of claim 12, wherein the first cooperating rod comprises second pin through holes therein which are dimensioned to receive the second locking pin.

14. The base station antenna assembly of claim 9, wherein the first cooperating rod is dimensioned to be shorter in length than the first guide rail.

15. The base station antenna assembly of claim 14, further comprising first and second locking pins, wherein the first guide rail comprises top and bottom walls each having pin through holes therein which are dimensioned to receive the first and second locking pins.

16. A base station antenna assembly, comprising:

a base station antenna having a frame and a radome that covers the frame;

a first radio mounted on a radio support plate;

a first guide rail mounted on the base station antenna and comprising a slot having top and bottom walls each having a first pin through hole therein; and a first cooperating rod mounted on the radio support plate, wherein the first guide rail and the first cooperating rod are configured so that when the first cooperating rod is received within the slot in the first guide rail the radio support plate is mounted on the base station antenna.

17. The base station antenna assembly of claim 16, further comprising a first locking pin dimensioned for insertion into the first pin through holes of the first guide rail.

18. The base station antenna assembly of claim 17, wherein the top and bottom walls each have a second pin through hole therein, the base station antenna assembly further comprising a second locking pin dimensioned for insertion into the second pin through holes of the first guide rail.

19. The base station antenna assembly of claim 18, wherein the first cooperating rod is dimensioned to be shorter in length than the first guide rail.

20. The base station antenna assembly of claim 18, wherein the first cooperating rod comprises at least one first pin through hole and at least one second pin through hole therein which are dimensioned to receive the first and second locking pins, respectively.

* * * * *